April 16, 1968    J. C. HASTINGS    3,378,763

EDDY CURRENT PROBE WITH TEMPERATURE COMPENSATION

Original Filed Aug. 29, 1963

INVENTOR.
JOSEPH C. HASTINGS
BY
Douglas R. McKechnie
ATTORNEY

United States Patent Office 3,378,763
Patented Apr. 16, 1968

3,378,763
EDDY CURRENT PROBE WITH TEMPERATURE COMPENSATION
Joseph C. Hastings, Wayne, Pa., assignor to The Budd Company, Philadelphia, Pa., a corporation of Pennsylvania
Continuation of application Ser. No. 305,468, Aug. 29, 1963. This application Sept. 14, 1967, Ser. No. 667,861
1 Claim. (Cl. 324—40)

ABSTRACT OF THE DISCLOSURE

An eddy current test probe includes two groups of coils with each group including four coils. The coils are wound in a bifilar relationship and connected to provide a balanced circuit having temperature compensation.

---

This is a continuation of application Ser. No. 305,468, filed Aug. 29, 1963, now abandoned.

This invention relates to a test probe and, more particularly, to an eddy current probe of an eddy current tester for non-destructively detecting flaws in metal objects.

Eddy current testing is a common form of testing wherein eddy currents are induced in a conductive test object. The eddy current creates magnetic fields that can be detected by search coils whereby those factors, such as cracks or other flaws in the object, which affect the strength of the eddy currents, will also affect the currents induced in the search coils.

The probe of an eddy current tester usually contains two similar inductive search coils wired in series, and the eddy currents are induced in the test object by exciting these coils with an alternating current and placing the coils asymmetrically relative to the test object whereby the induced eddy currents induce in the search coils voltages of different phase and magnitudes. That is, the voltages induced in the search coils are unbalanced. The associated equipment, which normally contains some form of an indicator, senses this imbalance and indicates the degree thereof so that by comparing the degrees of imbalance between different portions of the test object or between the test object and a standard object, the presence of flaws can be ascertained.

However, various factors in the probe, such as a temperature differential between the search coils can cause an unwanted imbalance. If one coil is warmer than the other, and this temperature difference may be less than one degree Fahrenheit, the resistances of the coils differ causing a detectible and undesirable resistive imbalance that affects the sensitivity of the tester.

Accordingly, one of the objects of the invention is to minimize or eliminate the imbalance of an eddy current probe caused by a temperature differential between coils thereof.

Another object is to provide a temperature compensated search probe that is simple and easy to construct and operate.

Other objects and advantages of the invention will be apparent from the following description taken in connection with the accompanying drawing wherein.

Figure 1:
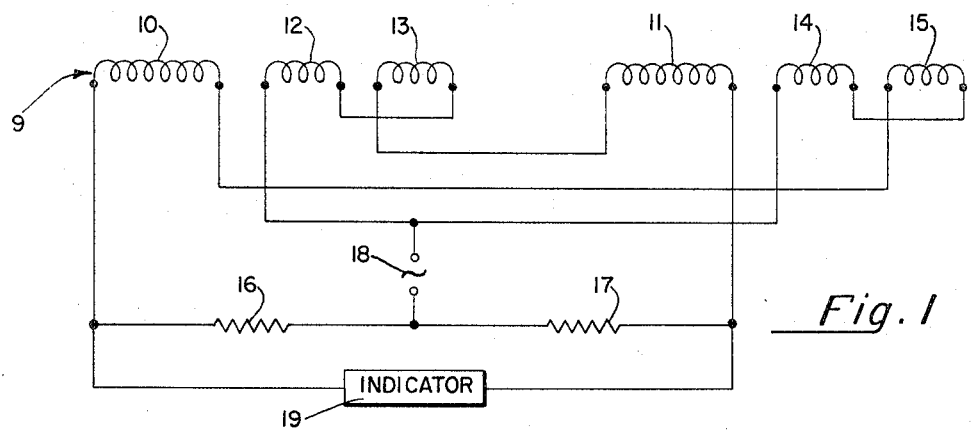
FIG. 1 is a schematic wiring diagram of an eddy current tester embodying the invention.

Referring now to the drawing, FIG. 1 illustrates an eddy current tester comprising a probe 9 that includes a pair of similar search coils 10 and 11 connected in series with each other through temperature compensating coils 12–15. Coils 12 and 13 are of equal turns and they are connected in series opposition so that induced voltages are cancelled. Coils 12 and 13 are physically located in heat conductive relationship adjacent to coil 10 so as to be responsive to the temperature thereof whereby coils 10, 12 and 13 are at the same temperature. Similarly, coils 14 and 15 are of equal turns; they are connected in series opposition so that the voltages induced therein are cancelled; and they are located adjacent coil 11 so these coils are at the same temperature.

Coils 12 and 13 are connected in series with coil 11 to form one arm of a bridge circuit and coils 14 and 15 are connected in series with coil 10 to form another arm of the bridge circuit. Additionally, the bridge includes a pair of resistors 16 and 17 connected to form the other arms of the bridge. The bridge is energized by an alternating current from a power source 18 to produce an output that is fed to an indicator 19, the values of the coils and resistors being chosen so as to produce a balanced bridge, that is, a null output, in air.

Figure 3:
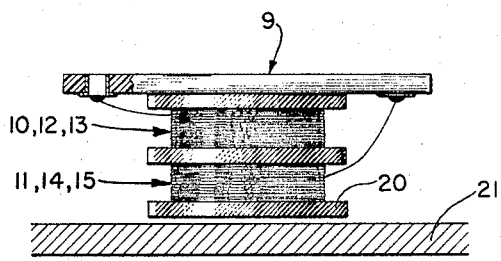
FIG. 3 is a side elevational view, partly in section of, an eddy current probe.

In FIG. 3, the invention is illustrated as applied to an area probe comprising a bobbin 20 having two axially spaced, radially extending recesses one of which contains coils 10, 12 and 13 and the other of which contains coils 11, 14 and 15. In operation, probe 9 is brought adjacent to a testpiece 21 whereby coils 10, 12 and 13, and coils 11, 14 and 15 are asymmetric to the workpiece 21. As the coils are energized by alternating current, eddy currents are induced in the testpiece 21, and these eddy currents, in turn, induce in the coils voltages which, in each pair of compensating coils are cancelled, and which in the output of coils 10 and 11 are unbalanced to provide an indication that is fed to indicator 19.

Coils 12 and 13 have a combined resistance equal to that of coil 10, the search coil located adjacent thereto, and coils 14 and 15 have a combined resistance equal to that of coil 11. Furthermore, the temperature versus resistance characteristics of the compensating coils are the same as that of the adjacent search coils whereby should one of the search coils experience a temperature variation, and hence alter the resistance of the bridge arm in which it is located, the compensating coils will undergo the same resistance change and thereby change the resistance in the other bridge arm an equal amount, and thereby offset the effect of the temperature differential.

Figure 2:
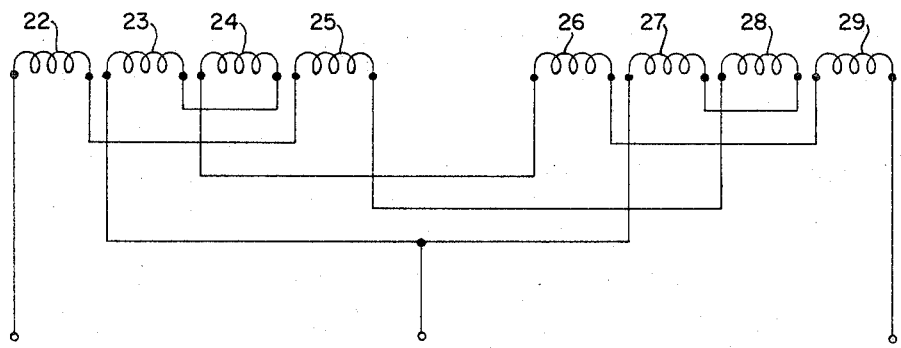
FIG. 2 is a schematic wiring diagram of a modified form of the probe shown in FIG. 1.

With reference to FIG. 2 one convenient way to produce the search coil is to wind a dual-bifilar cable to produce two windings of equal turns. Since each winding contains four insulated conductors, each winding will have four coils. One winding contains coils 22–25 and the other contains coils 26–29. In one winding, two coils, namely coils 22 and 25 are connected in series aiding the remaining two coils, are connected in series opposition. In the other winding, coils 26 and 29 are connected in series aiding and coils 27 and 28 are connected in series opposition. The series aiding coils, which form the search coil of each winding, are connected in series with the series opposition coils of the other winding. As shown in FIG. 2, coils 22 and 25 are connected in series with coils 27 and 28 and coils 23 and 24 are connected in series with coils 26 and 29, the resultant connection forming two arms of a bridge which can be connected as shown in FIG. 1.

While the invention has been described with reference to an area probe, it will be apparent that it can be used in other forms of eddy current probes, such as I.D. and O.D. coils, and that it can be used in other types of search coils which are inductively coupled to a test object and which might undergo a resistive imbalance due to a temperature differential between the coils thereof. It will also be apparent to those skilled in the art that changes can be made in the details and arrangement of parts without departing from the scope of the invention as defined in the appended claim.

What is claimed is:

1. An eddy current probe for testing metal conductive objects, comprising: first and second groups of coils, each group comprising four coils of equal turns, the coils of each group wound upon a core in a dual bifilar arrangement and located adjacent each other so that all the coils of each group in said dual bifilar arrangement are subjected to substantially the same temperature conditions, while separated from the coils of the other group which may be at a different temperature, two coils of each group being connected in series aiding to provide test coils inductively coupled to said objects and two coils of each group connected in series opposition to provide temperature compensation coils; said two coils in series opposition also being inductively coupled to said objects with the inductive effect being cancelled by the series opposition connection therebetween; the series aiding coils of each group being connected in series with the series opposition coils of the other group and connected to form one arm of a balanced bridge circuit, and unbalance indicator means connected to said bridge circuit to indicate flaws detected by said test coils.

References Cited
UNITED STATES PATENTS

| | | | |
|---|---|---|---|
| 2,343,159 | 2/1944 | Sias | 317—131 |
| 2,700,829 | 2/1955 | Statsinger | 33—226 |
| 2,703,384 | 3/1955 | Rendel | 324—34 |
| 2,957,129 | 10/1960 | Irwin | 324—40 |

RUDOLPH V. ROLINEC, *Primary Examiner.*

WALTER CARLSON, *Examiner.*

R. J. CORCORAN, *Assistant Examiner.*